United States Patent [19]
Santini

[11] Patent Number: 5,621,596
[45] Date of Patent: Apr. 15, 1997

[54] LOW PROFILE THIN FILM WRITE HEAD

[75] Inventor: Hugo A. E. Santini, San Jose, Calif.

[73] Assignee: International Business Machines Corporation, Armonk, N.Y.

[21] Appl. No.: 560,062

[22] Filed: Nov. 17, 1995

Related U.S. Application Data

[63] Continuation-in-part of Ser. No. 296,301, Aug. 25, 1994, abandoned.

[51] Int. Cl.$^6$ ............................ G11B 5/147; G11B 5/127
[52] U.S. Cl. ........................ 360/126; 360/125; 360/110; 29/603.07
[58] Field of Search ....................... 360/126, 125, 360/127, 106, 113, 119, 110, 123; 29/603.01, 603.07, 603.13

[56] References Cited

U.S. PATENT DOCUMENTS

| | | | |
|---|---|---|---|
| 542,164 | 9/1895 | Cole et al. | 360/126 |
| 4,804,816 | 2/1989 | Hata | 219/121.2 |
| 4,816,946 | 3/1989 | Kira et al. | 360/110 |
| 4,839,197 | 6/1989 | Henderson | 360/119 |
| 4,938,841 | 7/1990 | Shahar et al. | 156/661.1 |
| 5,184,394 | 2/1993 | Hsie et al. | 29/603 |
| 5,193,037 | 3/1993 | Pace | 360/106 |
| 5,212,609 | 5/1993 | Yuito et al. | 360/113 |
| 5,241,440 | 8/1993 | Ashida et al. | 360/126 |
| 5,256,266 | 10/1993 | Blanchette et al. | 204/192.3 |
| 5,435,053 | 7/1995 | Krounbi et al. | 360/113 |

FOREIGN PATENT DOCUMENTS

| | | |
|---|---|---|
| 2-216605 | 8/1990 | Japan. |
| 4-042416 | 2/1992 | Japan. |

*Primary Examiner*—John H. Wolff
*Assistant Examiner*—A. Giordana
*Attorney, Agent, or Firm*—Baker, Maxham, Jester & Meador

[57] ABSTRACT

A thin film low profile write head is provided which has first and second pole pieces which are magnetically connected in a pole tip region and at a back gap. The pole tip region is located between the head surface and a zero throat height and the head has a body region which is located between the zero throat height and the back gap. A plurality of insulation layers are located above the first pole piece in the body region. Each of the insulation layers has an apex where the insulation layer commences and each insulation layer extends from its apex toward the back gap. The plurality of insulation layers typically includes first, second and third insulation layers. In the preferred embodiment the apex of the second insulation layer is located at and defines the zero throat height of the head. This enables a very narrow track width second pole tip to be constructed simultaneously with the second pole piece using ordinary photolithography processes. Further it enables the insulation layers, the coil layer and the second pole piece to be thinner than prior art layers.

62 Claims, 10 Drawing Sheets

(INSULATION STACK)

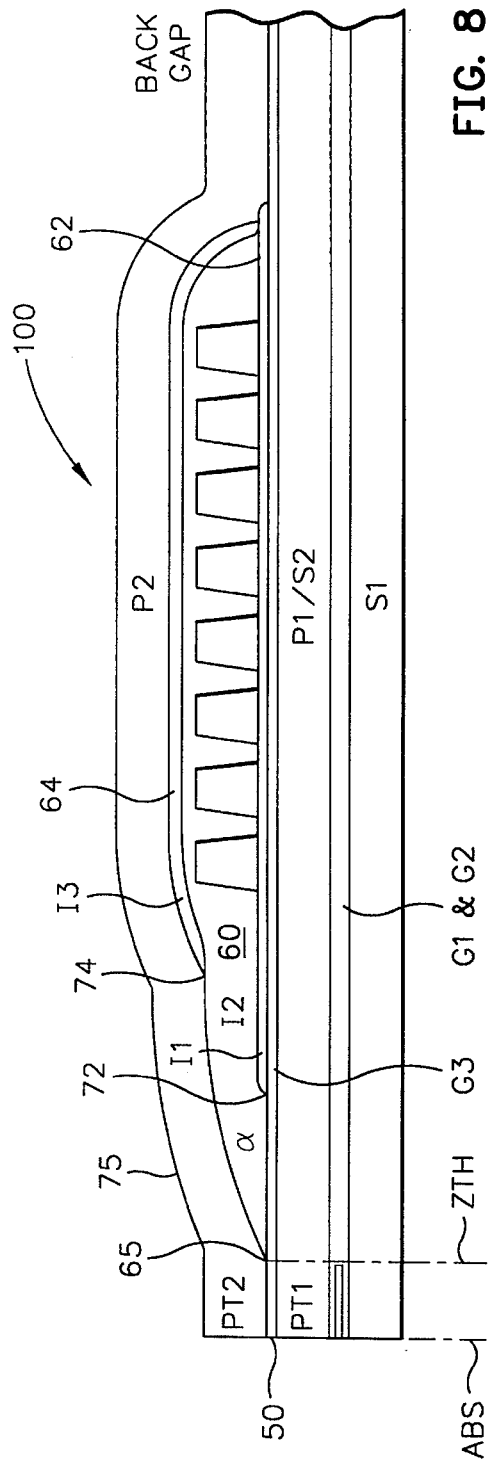
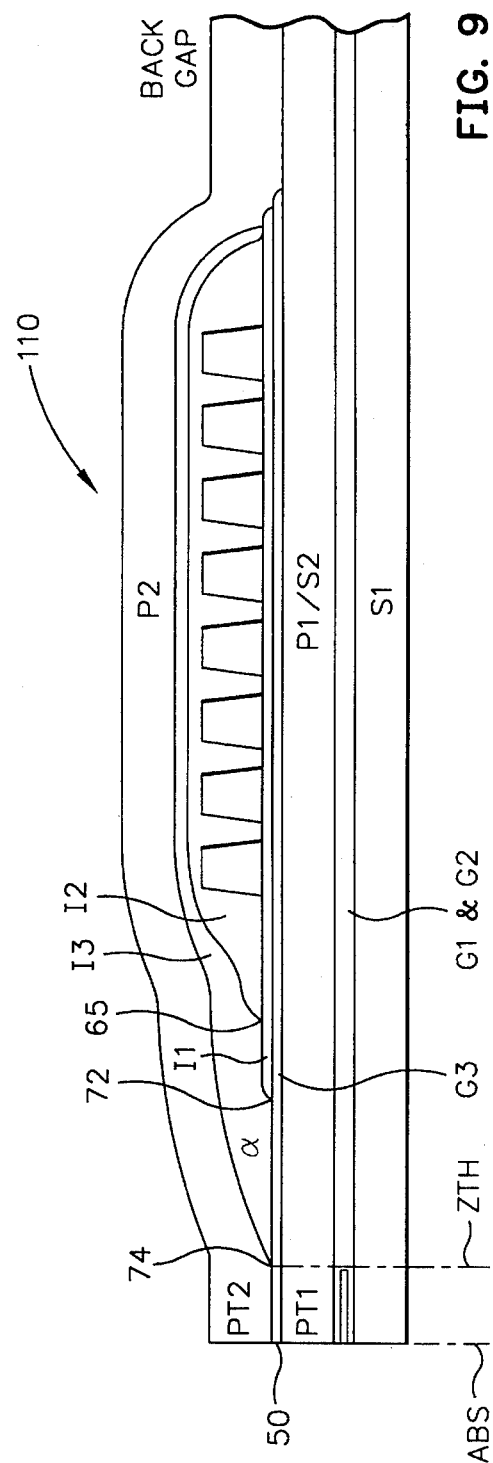
FIG. 8
FIG. 9

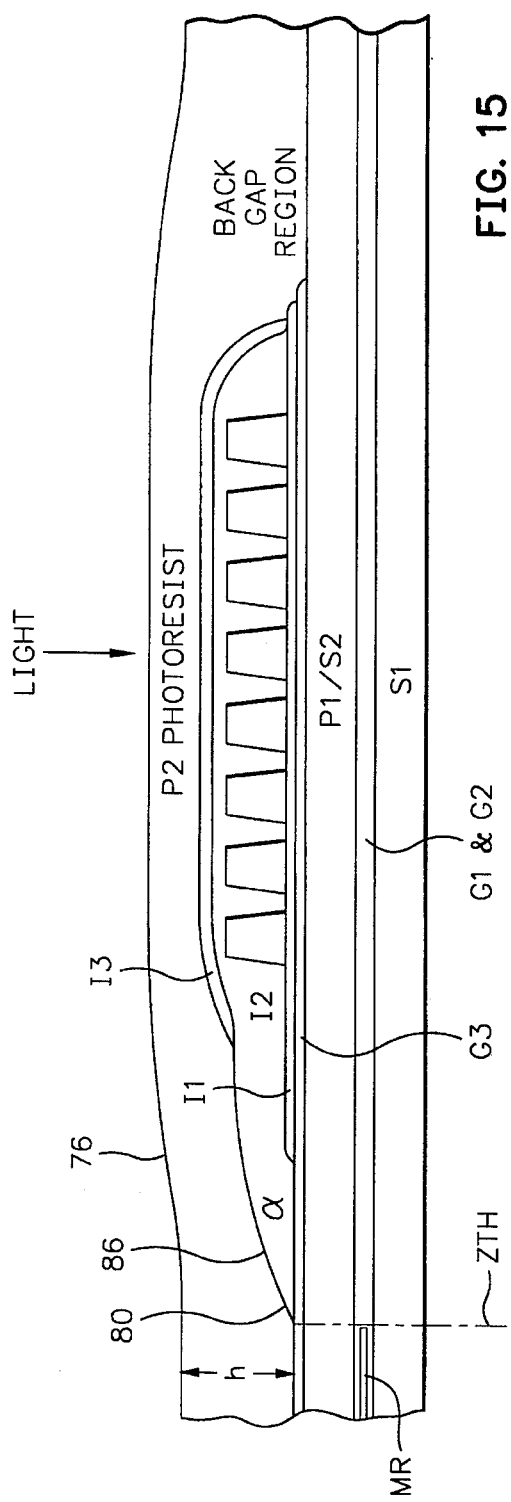
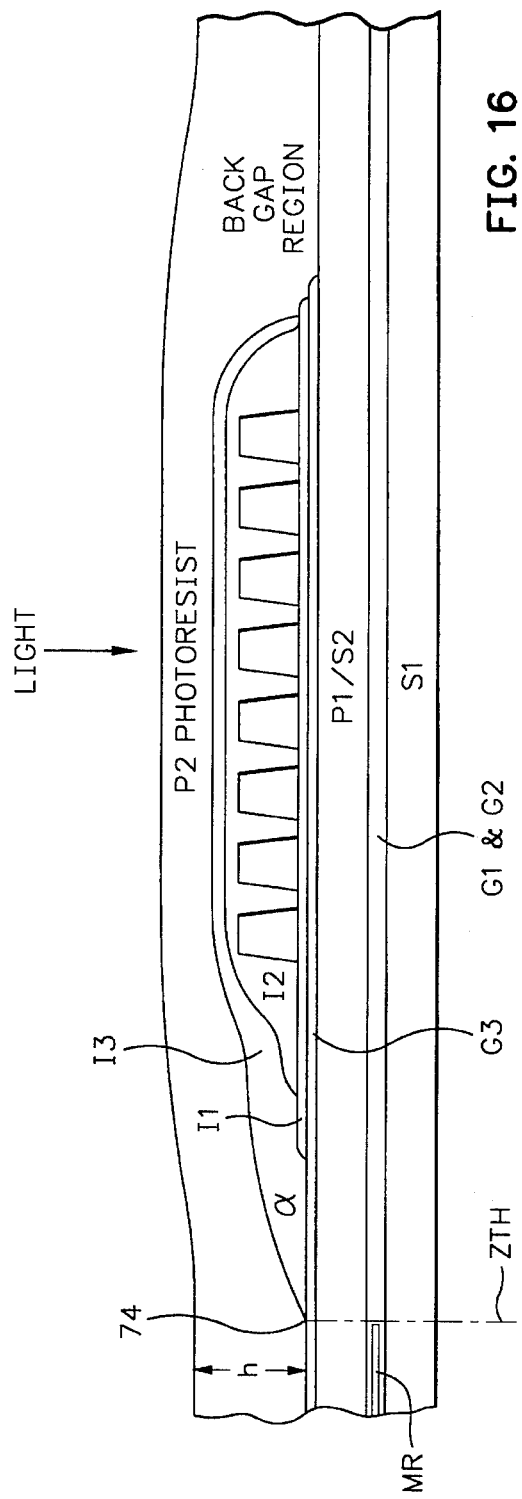

LOW PROFILE THIN FILM WRITE HEAD

CROSS-REFERENCE TO RELATED APPLICATION

This application is a continuation-in-part of application Ser. No. 08/296,301 filed Aug. 25, 1994 now abandoned.

BACKGROUND OF THE INVENTION

1. Field of the Invention

The present invention relates to a thin film write head and more particularly to a thin film write head in which a second pole tip with narrow track width can be patterned and plated simultaneously with a second pole piece.

2. Description of the Related Art

A thin film write head includes first and second pole pieces which are magnetically connected in a pole tip region and at a back gap. In the pole tip region the first and second pole pieces provide first and second pole tips which are separated by a thin insulative gap layer. The pole tip region is defined by a head surface and a zero throat height between the head surface and the back gap. A yoke or body portion of the head lies between the zero throat height and the back gap. In the body portion of the head there are located one or more layers of pancake coils and a plurality of insulation layers. The pancake coils couple flux into the pole pieces and/or receive flux therefrom.

Each of the insulation layers has an apex near the pole tip region where the insulation layer commences. Each apex is located at or between the zero throat height and the back gap. In the prior art the apex of a first insulation layer above the first pole piece is typically located at and defines the zero throat height. Each insulation layer has a steep sloping surface from its apex to its highest level above the first pole piece. This slope is caused by a process step in which the insulation layer is heated. The heating process drives out solvents causing the insulation layer to shrink and slope from the apex to the highest level.

The second pole piece has a flare point at which it widens beyond the width of the second pole tip to form a large main body portion. This flare point is located between the zero throat height and the back gap. If the flare point is set too far back towards the back gap flux may leak from the pole piece due to the extra length of narrow material through which the flux must be transmitted. However, setting the flare point too close to the zero throat height may prevent simultaneous fabrication of the second pole piece and a high resolution narrow track width second pole tip as will be explained in more detail hereinafter.

The thickness of the gap layer between the second pole tip and the first pole tip, and the configuration of the second pole tip are the most crucial elements in a thin film write head. The thickness of the gap layer at the head surface determines the linear density of the head, namely how many bits per linear inch of a magnetic medium the head can write. The width of the second pole tip determines head track width, which establishes how many tracks per width of a magnetic medium in inches can be written by the head. The product of these two factors is areal density. With present day demands for storing and processing large amounts of data, such as in high definition television (HDTV), there is a strong felt need for a thin film write head which provides high areal density by way of a high resolution, narrow track width second pole tip.

A high resolution second pole tip can be made by an image transfer process followed by reactive ion etching. The image transfer process typically masks the top surface of a resist layer with a metal pattern which is unaffected by reactive ion etching. The area not covered by the mask is where the pole tip is to be plated, and this area is shaped by reactive ion etching. The steps of depositing the metal pattern and etching are very costly. The second pole tip can also be made by ion beam etching in which the second pole piece is bombarded with ions to form a second pole tip with a desired track width. This process is also very costly. In both of these methods the second pole tip is constructed individually and then the remainder of the second pole piece is stitched to the second pole by ordinary photolithography and plating.

The least costly process for making the second pole tip is to construct it with the same process steps which construct the second pole piece. These process steps employ a single photoresist layer which can be patterned for plating the entire second pole piece along with the second pole tip in a single operation. However, prior art methods of constructing the second pole piece and the second pole tip with the same process steps have not provided a high resolution second pole tip. When the second pole piece and the second pole tip are constructed simultaneously by ordinary photolithography a photoresist layer is spin coated onto the body portion and pole tip region of the head. The photoresist layer is located above a gap layer in the pole tip region and above a stack of insulation layers in a coil region. The insulation stack is typically 7 to 8 microns ($\mu$m) above the gap layer and has a marked slope as the first insulation layer transitions to its apex at the zero throat height closely followed by the pancake coil and the insulation layers in the coil region. When the resist is spin coated onto a wafer it substantially planarizes across the body portion and the pole tip region, causing the resist in the pole tip region to be considerably thicker than the resist in the body portion of the head. The thickness of the resist in the body portion of the head is dictated by the desired thickness of the second pole piece. For example, if the second pole piece in the body portion is to be 4 $\mu$m thick the photoresist layer would have to be approximately 4.5 $\mu$m thick. With a typical insulation stack of about 8 $\mu$m this results in the resist layer being about 11 $\mu$m thick in the pole tip region. This thickness in the pole tip region plus the steep slope of the insulation layers near the pole tip region makes it very difficult to construct a narrow track width second pole tip with subsequent photolithography steps. In a viable manufacturing process for making high resolution thin film write heads the aspect ratio of the thickness of the photoresist layer with respect to the track width of the pole tip should be in the order of 4 to 1. Accordingly, the thickness of the photoresist should be no more than four times the desired track width of the second pole tip.

After the photoresist layer is deposited it is patterned by the exposure of light in one or more areas which are to be removed by a subsequent step of dissolving the exposed photoresist. Because of the thickness of the photoresist in the pole tip region the intensity of the light for patterning has to be high in order to penetrate the full depth of the photoresist. When the intensity of the light is high the narrow slits employed for patterning miniature features introduce deflective components in the light at the edges of the slits, which causes the light to fringe as it strikes the photoresist. This results in poor resolution. A more serious problem however is the reflection of light into the pole tip region from sloping insulation layers behind the zero throat level. In an aggravated situation assume that the flare point of the second pole tip is to be in the same plane with the zero throat height. The patterned photoresist layer commences its flare at the zero throat height and widens quickly toward the back gap to the full width of the second pole piece. This exposes a large expanse of the sloping portions of the insulation layers immediately behind the pole tip region. When light is exposed in these areas it is heavily reflected at an angle of incidence from the sloping portions of the insulation layers into the pole tip region where it is not wanted. The result is that the reflected light notches the photoresist layer in the pole tip region, substantially reducing the resolution of the second pole tip. Plating after this type of patterning results in a second pole tip which has irregularly shaped side walls and a poor size control of line width.

A solution to the reflection problem is to move the flare point further away from the zero throat height towards the backgap. If the flare point is pushed far enough back the reflected light will not reach the pole tip region. The light will simply be reflected into a narrow portion of the pole piece area behind the zero throat height where notching occurs without any substantial effect on the size control of the second pole tip. However, moving the flare point rearwardly extends the length of this narrow portion through which flux must be transferred from the large part of the second pole piece to the second pole tip, resulting in flux leakage from the narrow portion, which severely degrades the performance of the head.

SUMMARY OF THE INVENTION

The present invention employs a typical photoresist patterning process to simultaneously construct a second pole piece and a high resolution second pole tip with a narrow track width. This is accomplished primarily by utilizing one of the insulation layers for defining the zero throat height without interference from the other insulation layers. In a preferred embodiment of my invention the apex of the second insulation layer is located at and defines the zero throat height. With this arrangement I have discovered that proper positioning of the other insulation layers will contribute significantly to the quality of the head. The first insulation layer can be moved back towards the back gap so that its sloping portion will not reflect light into the pole tip region during the photolithography process or affect the profile of the zero throat height defining insulation. By distancing the apex of the first insulation layer about 5 µm from the zero throat height this goal is achieved. Secondly, the first insulation layer can be made much thinner than the prior art first insulation layers. With the present invention the first insulation layer is reduced from the prior art thickness of about 1.8 µm to about 0.5 µm. This reduction significantly contributes to a lower topography of the body portion of the head. The third insulation layer can be still further back on the head so that it will also not affect the patterning for the second pole tip.

During photolithography the illumination intensity is reduced because the depth of the photoresist in the pole tip region is about one-half of what it was in the prior art. Since the slope of the second insulation layer is the only slope close to the pole tip region very little light will be reflected from the slope into the pole tip region during illumination of the photoresist. Further, all other insulation layers other than the second insulation layer have been located rearwardly, towards the back gap, so that buildup of a thick photoresist layer in the pole tip region does not occur. This allows the flare point to be much closer to the zero throat height than for prior art heads. With the present invention the flare point can be on the order of 2 µm from the zero throat height. This decreases the amount of flux leakage by shortening the length of narrow second pole piece material between the zero throat height and the flare point. I have also discovered that I can make the layers on top of the first insulation layer significantly thinner. I have found that the coil layer can be reduced about 20 percent, that the second insulation layer can be reduced about one-third, that the third insulation layer can be reduced about 25 percent and that the second pole tip can be reduced about 25 percent. With the present invention the height of the photoresist in the pole tip region can be approximately 6.5 µm which makes the aspect ratio for the 2 Gb second pole tip now possible. With the present invention I have also been able to maintain the height of the insulation stack to approximately 5 µm as compared to 8–12 µm in the prior art.

An object of the present invention is to make a second pole piece and a high density second pole tip in a simultaneous photolithography patterning process.

Another object is to make a high density thin film write head without image transfer, reactive ion etching or ion beam processes.

A further object is to provide a compact, high density thin film write head.

Yet another object is to overcome the problem of reflective notching in a pole tip region when a photolithography process is employed to simultaneously construct the second pole piece and the second pole tip.

Still another object is to provide a more efficient high density thin film write head which can be constructed with less cost.

Still a further object is to provide a thin film write head which has a high resolution second pole tip, a flare point close to the zero throat height, and a head height which is less than the prior art.

Still another object is to fabricate a thin film inductive head in which only one insulation layer participates in the formation of the apex angle at the zero throat height without any interaction from other components of the head.

Other objects, advantages and features of this invention will be more clearly understood from the following detailed description, when read in conjunction with the accompanying drawing.

DESCRIPTION OF THE DRAWINGS

FIG. 8 is a cross sectional side view of one embodiment of the present invention where the apex of the second insulation layer defines the zero throat height.

FIG. 9 is a cross-sectional side view of another embodiment of the present invention where the third insulation layer defines the zero throat height.

FIG. 15 is similar to FIG. 8 except a photoresist layer is shown for patterning the second pole piece and the second pole tip when I2 defines the zero throat height.

FIG. 16 is similar to FIG. 9 except a photoresist layer is shown for patterning the second pole piece and the second pole tip when I3 defines the zero throat height.

DETAILED DESCRIPTION OF THE PREFERRED EMBODIMENTS

Figure 1:
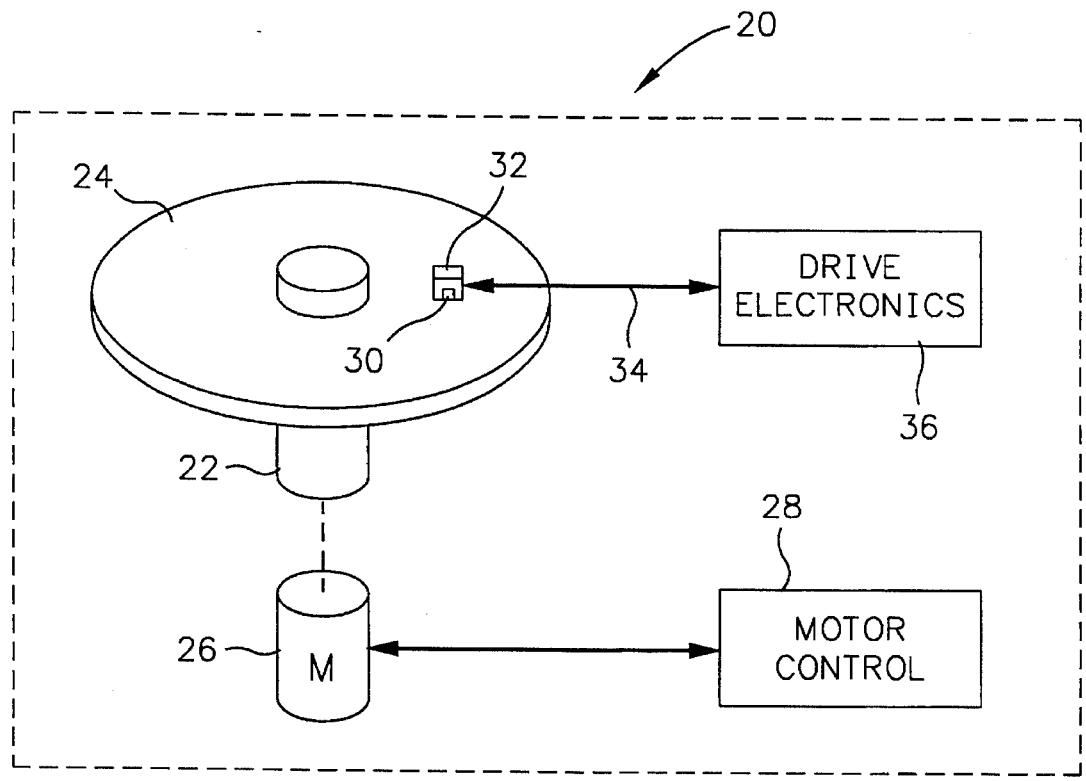
FIG. 1 is a schematic block diagram of the present thin film low profile write head being employed in a magnetic medium drive, such as a magnetic disk drive.

Referring now to the drawings wherein like reference numerals designate like or similar parts throughout the several views there is illustrated in FIG. 1 a magnetic disk drive 20. The drive 20 includes a spindle 22 which supports and rotates a magnetic disk 24. The spindle 22 is rotated by a motor 26 which is controlled by motor controls 28. A magnetic head 30, which may be a merged MR head for recording and reading, is mounted on a slider 32 which in turn is supported by a suspension and actuator arm 34. The suspension and actuator arm 34 positions the slider 32 so that the magnetic head 30 is in a transducing relationship with a surface of the magnetic disk 24. When the disk 24 is rotated by the motor 26 the slider rides on a thin cushion of air (air bearing) slightly off the surface of the disk, in the order of 0.075 μm. The magnetic head 30 is then employed for writing information to multiple circular tracks on the surface of the disk 24 as well as for reading information therefrom. These information signals as well as control signals for moving the slider to various tracks are processed by drive electronics 36.

Figure 2:
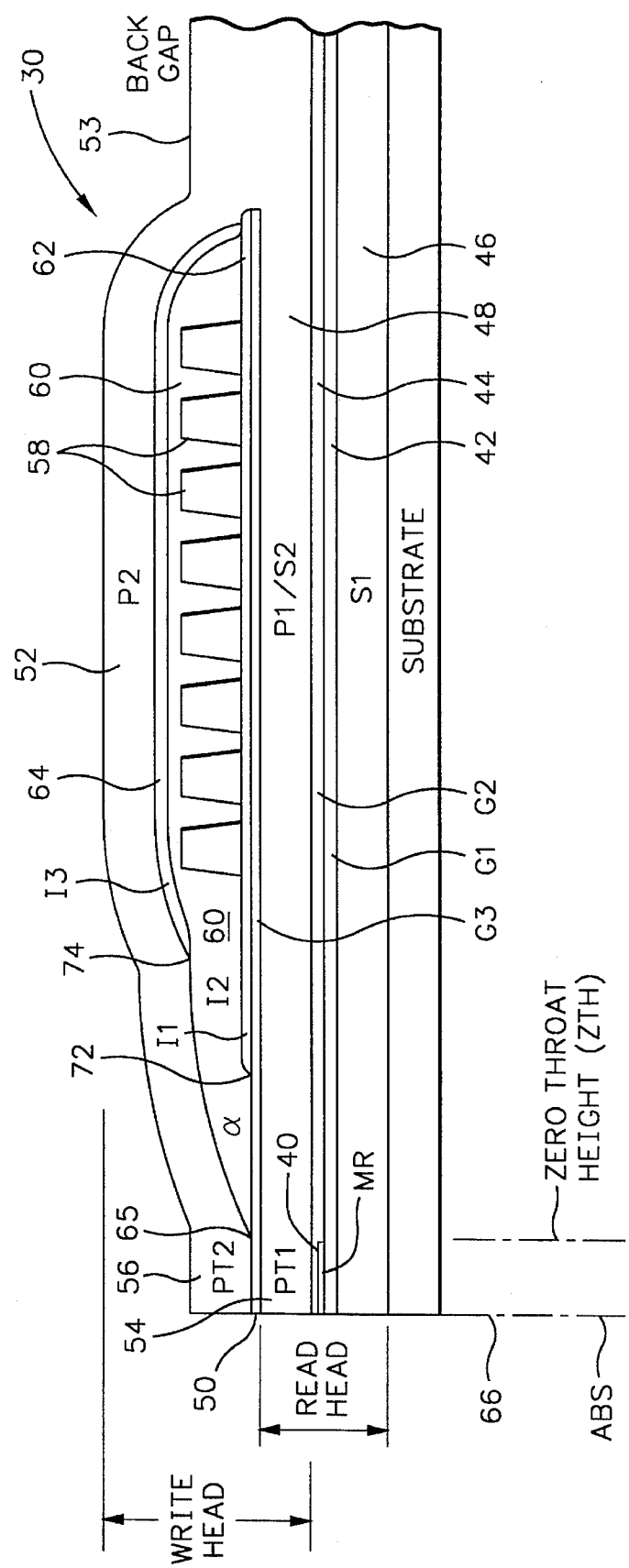
FIG. 2 is a cross sectional side view of the low profile write head being used in combination with a MR read head to form a merged MR head.

FIG. 2 is a side cross sectional elevation view of a front portion of a merged MR head 30 which employs the present invention. The merged MR head includes a write head portion which is stacked on top of an MR read head portion. The MR read head portion includes an MR stripe 40 which is sandwiched between first and second gap layers 42 and 44 which are in turn sandwiched between first and second shield layers 46 and 48. In a merged MR head the second shield layer 48 is employed as the first pole piece for the write head. In a piggyback MR head (not shown) the first pole piece of the write head portion is a separate layer on top of the second shield layer of the MR read head. A gap layer 50 is sandwiched between the first pole piece 48 and a second pole piece 52 which are magnetically connected at a back gap 53. The forward ends of these pole pieces 48 and 52 form first and second pole tips 54 and 56 respectively which are magnetically separated in a transducing relationship by the gap layer 50. The second pole tip is the most critical element of the write head since it is the last pole tip to induce magnetic flux signals into the moving magnetic medium adjacent the head surface. Accordingly its width is very important in establishing the density capability of the head. A coil layer 58 and a second insulation layer 60 are sandwiched between first and third insulation layers 62 and 64 which in turn are sandwiched between the first and second pole pieces 48 and 52. A forward end or apex 65 of the second insulation layer 60 is located at and establishes a zero throat height (ZTH). The forward ends of all of the layers forward of the zero throat height form a head surface 66 which is referred to as an air bearing surface (ABS) in a disk drive. This air bearing surface is constructed by lapping the front of the head.

A pole tip region is located between the head surface 66 and the flare point and the head has a yoke or body region which is located between the flare point and the back gap. The first, second and third insulation layers 62, 60 and 64 are located above the first pole piece in the body region and are commonly referred to as an insulation stack. Each insulation layer has an apex where the insulation layer commences and each insulation layer extends from the apex toward the backgap.

Figure 3:
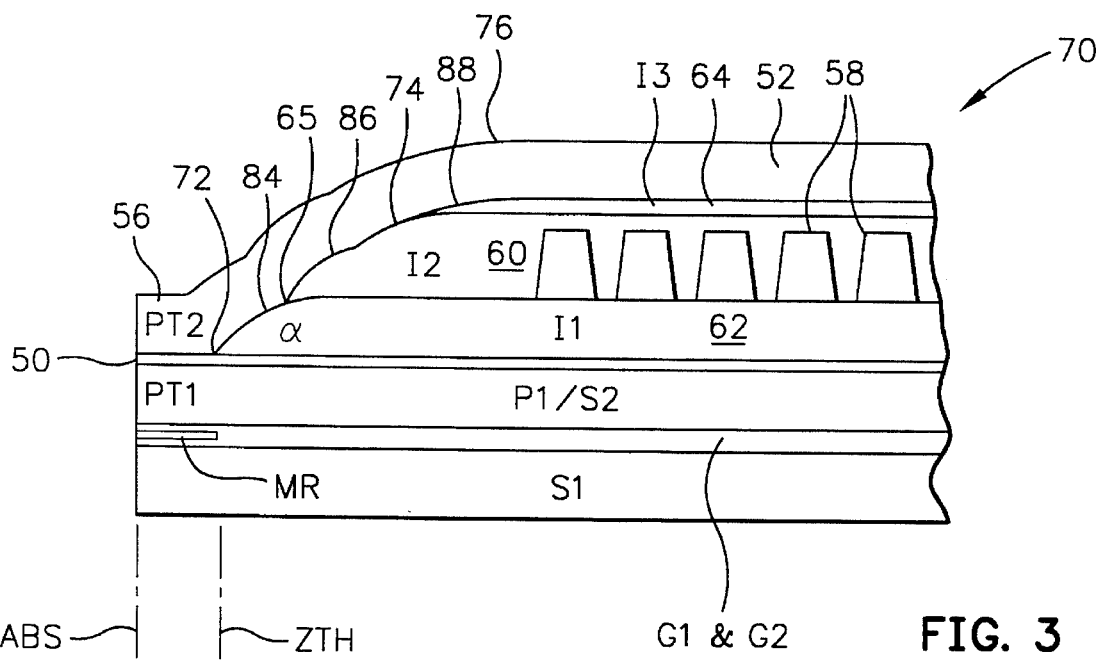
FIG. 3 is a cross sectional side view of a front portion of a prior art write head.

FIG. 3 is a front portion of a prior art thin film magnetic write head 70. This write head can be an inductive head only or the write head portion of a merged MR head or a write head portion of a piggyback MR head. In the prior art head an apex 72 of the first insulation layer 62 typically defines the zero throat height. The first insulation layer 62 slopes upwardly from its apex to a flat portion where the coil 58 and the second insulation layer 60 are formed. The second insulation layer 60 slopes upwardly from its apex 65 to a generally flat portion where the third insulation layer 64 is formed. The third insulation layer 64 slopes upwardly from an apex 74 to a generally flat portion. The third insulation layer 64 planarizes the ripples in the second insulation layer caused by the coil layer 58. When the second pole piece 52 is formed it has a high profile with consecutive sloping portions which replicate the sloping portions of the first, second and third insulation layers. The second pole piece has a flare point 76 which is located about 10 μm behind the zero throat height. The flare point is the location where the second pole piece 52 commences flaring from a narrow width, which is equal to the width of the second pole tip, to the large expanse of the second pole piece.

Figure 4:
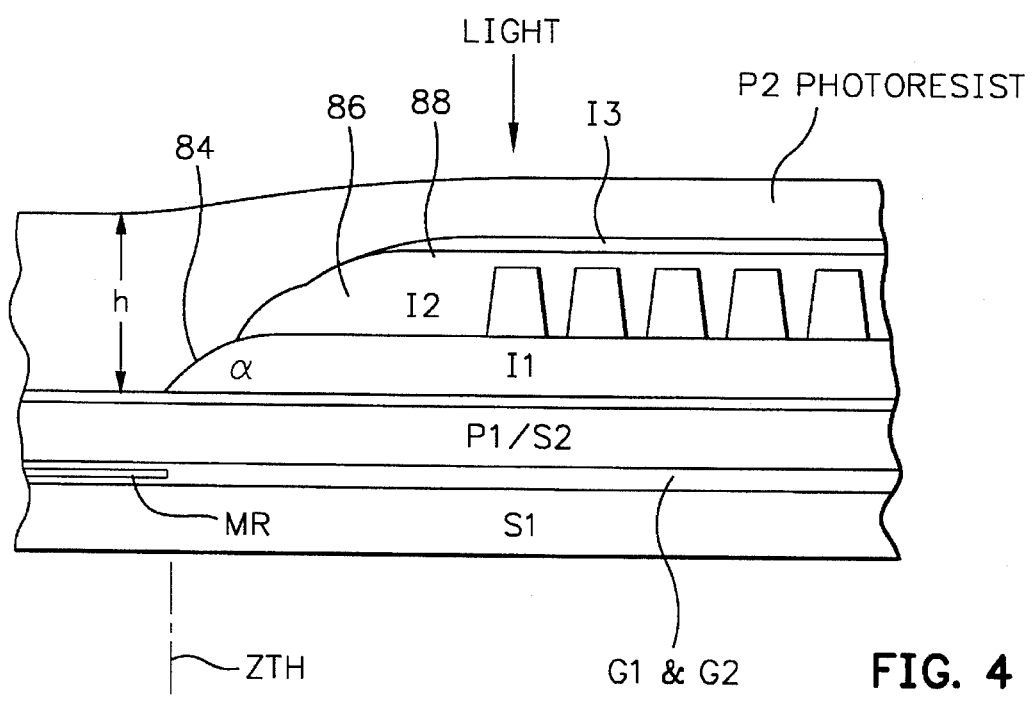
FIG. 4 is similar to FIG. 3 except a photoresist layer is shown for patterning second pole piece and the second pole tip.

The high apex angles α and high sloping portions of the first, second and third insulation layers pose a problem in the construction of a narrow width second pole tip 56. The problem commences when photoresist is spin coated on top of the partially completed head causing the photoresist to planarize across the insulation stack and the pole tip region, as shown in FIG. 4. Photoresist planarized in the pole tip region can be typically 12 μm thick while the photoresist above the insulation stack can be typically 4.5 μm thick. Resolution is lost when light is exposed into a thick layer of resist for photopatterning purposes. The light has to be intense to expose the full depth of the photoresist layer. When intense light is directed through narrow slits for patterning the light deflects at the edges of the slits causing poor imaging.

Figure 5:
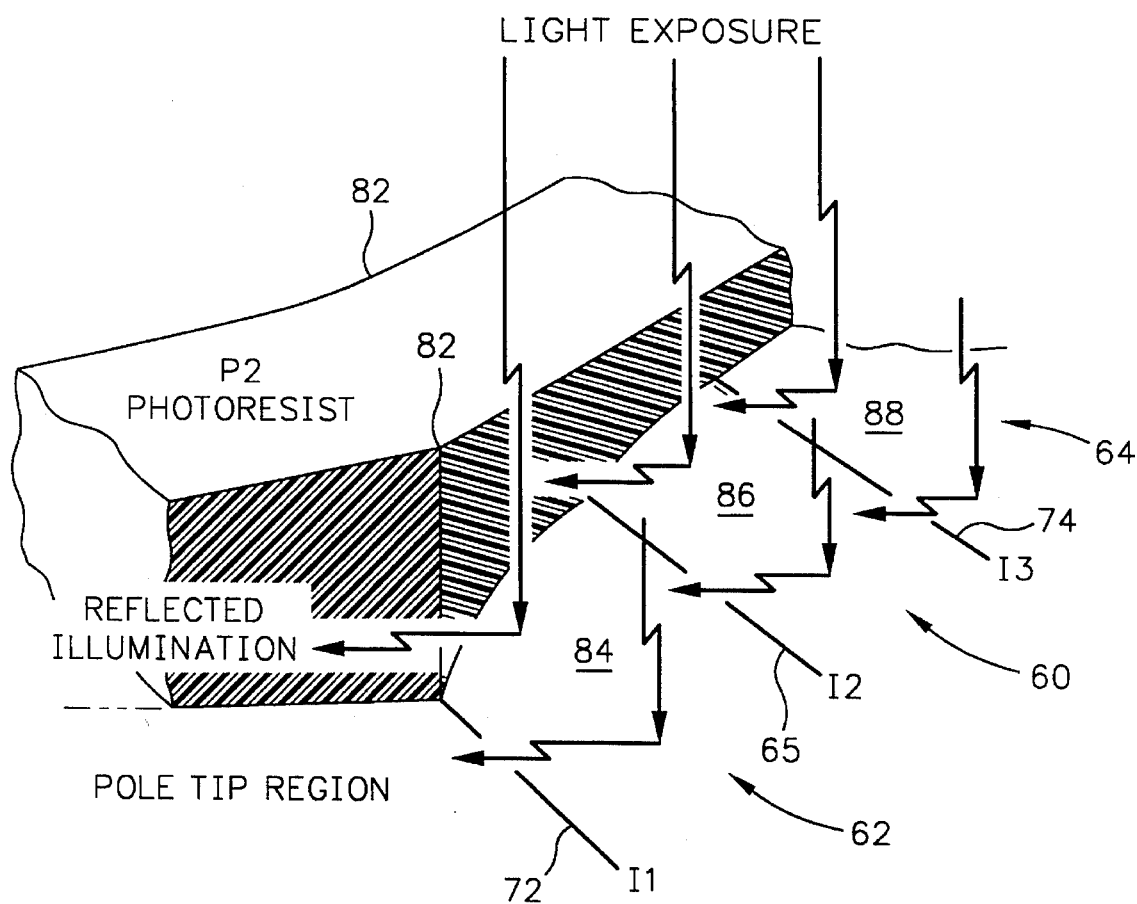
FIG. 5 is a schematic isometric illustration of the sloping portions of insulation layers reflecting light into a pole tip region during fabrication of a prior art head.

A more serious problem causing poor resolution in forming the second pole tip is due to the reflection of light from the top sloping portions of the first, second and third insulation layers during the light exposure step. FIG. 5 is an exaggerated example where a flare point 82 is located directly above the zero throat height (apex 72 of the first insulation layer 62) to illustrate the magnitude of the problem. When light penetrates through the photoresist in the area behind the flare point 82 it strikes sloping surfaces 84, 86 and 88 of the insulation layers at an angle of incidence. This causes light to be reflected directly into the pole tip region. This reflected light penetrates the photoresist in the pole tip region beyond the intended side walls of the second pole tip. This is called reflective notching and results in poorly formed photoresist walls for patterning the pole tip. The result is that when the pole tip is plated it has a poorly defined line width and poor resolution. In order to overcome this problem the prior art moves the flare point a significant distance back from the zero throat height, such as 10 μm, as illustrated in FIG. 3. With this arrangement only a very narrow region (same width as second pole tip) of the sloping portions of the insulation layers is exposed to light immediately behind the pole tip region. Accordingly, when the light exposure step is implemented virtually no light is reflected from the sloping portions of the insulation layers outside the second pole tip width to notch the pole tip region. The problem with this approach is that magnetic flux has to transition this very narrow portion of the second pole piece from the yoke point to the zero throat height which causes significant premature pole tip flux saturation. It would be desirable if the flare point could be positioned approximately 2 μm from the zero throat height so that this flux saturation is minimized.

Figure 6:
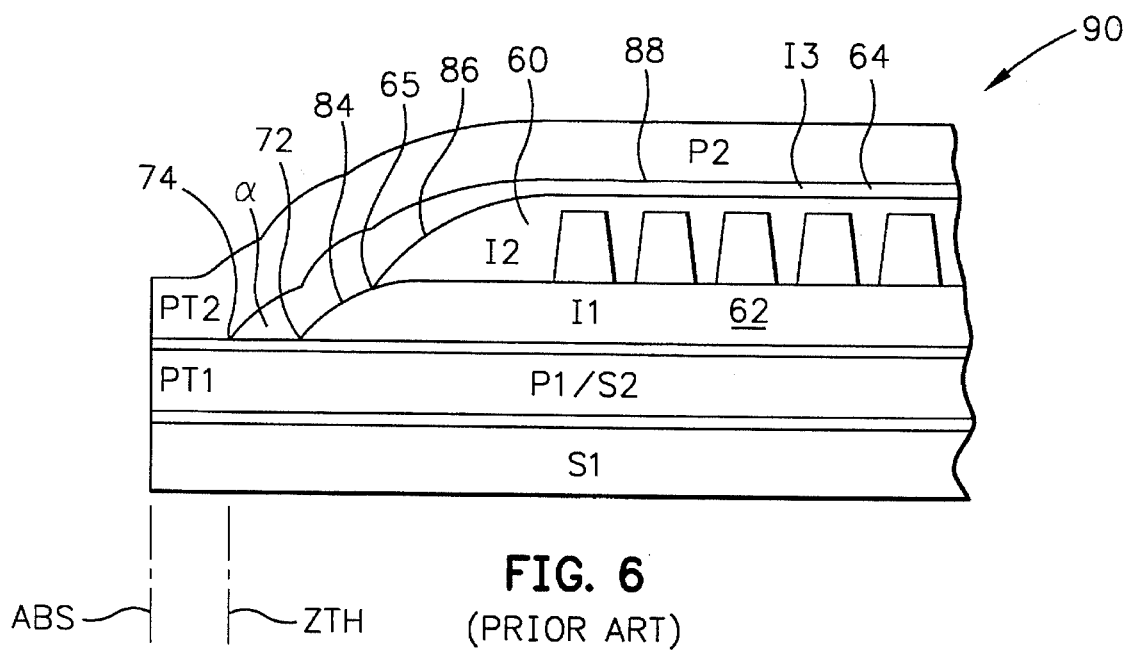
FIG. 6 is another prior art head where the third insulation layer defines the zero throat height.
Figure 7:
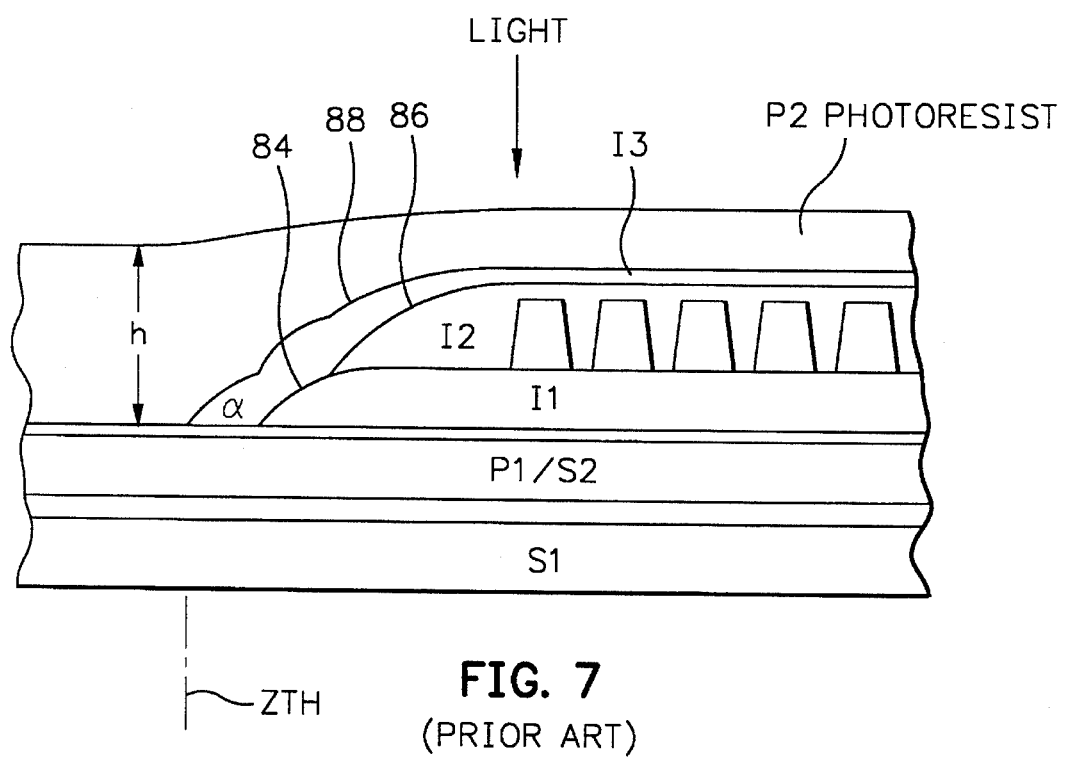
FIG. 7 is similar to FIG. 6 except a photoresist layer is shown for patterning the second pole piece and second pole tip.

Another prior art magnetic head 90 is illustrated in FIG. 6. In this head the apex 74 of the third insulation layer 64 is located at the zero throat height for forming the zero throat height. In this embodiment, the third insulation layer 64 is formed after the formation of the first insulation layer, the coil layer and the second insulation layer. With this arrangement the third insulation layer covers the ripples of the second insulation layer 60 so that the ripples will not be replicated into the second pole piece when it is plated. This construction, however, has a high profile similar or greater than the prior art head shown in FIG. 3. When the photoresist layer is spin coated, as shown in FIG. 7, the photoresist planarizes across the pole tip region making the photoresist very thick in this region. This causes the same deflection and reflection problems discussed hereinabove in regard to the prior art head shown in FIG. 3.

Typical thicknesses of the various layers of the prior art head shown in FIG. 3 are as follows: The write gap 50 is 0.4 μm, the first insulation layer 62 is 1.8 μm, the second insulation layer 60 is 4.3 μm, the coil layer 58 is 3.5 μm, the third insulation layer 64 is 0.8 μm and the second pole piece 52 is 4.5 μm.

FIG. 8 is an illustration of a low profile write head 100 according to the present invention. In this embodiment the first insulation layer 62 is not used for defining the zero throat height. The apex 72 of the first insulation layer is set back from the zero throat height towards the back gap approximately 5 μm. The pancake type coil layer 58 is then formed on top of the first insulation layer 62 with the first coil commencing from the zero throat height at a distance of about 15 μm. The second insulation layer 60 is then formed on top of the coil layer 58 with its apex 65 being located at and defining the zero throat height. An advantage of this arrangement is that the first insulation 62 layer can be kept comparatively thin, in the order of 0.5 μm as compared to 1.8 μm for the prior art first insulation layer. This significantly decreases the thickness of the insulation stack. The third insulation layer 64 is formed on top of the second insulation layer 60 to substantially planarize the construction as required for the formation of the second pole piece 52. The apex 74 of the third insulation layer can be on the order of 10 μm back from the zero throat height. Since a high profile insulation stack has been minimized behind the pole tip region the flare point 75 can be moved forward to about 2 μm behind the zero throat height. Because the flare point is moved forward in the present invention the thickness of the coil layer 58 can be in the order of 2.5 μm as compared to 3.5 μm for the prior art coil layer since the invention has less pole tip flux saturation. Consequently the second insulation layer 60 can be on the order of 2.5 μm as compared to 4.3 μm for the prior art second insulation layer. The apex angle α is also considerably less (see FIG. 18). Since the magnetic flux does not have to transition a long distance between the flare point to the zero throat height the second pole piece can be thinner. The second pole piece 52 can be on the order of 3 μm as compared to 4 to 5 μm for the prior art pole piece. With the present invention the height of the insulation stack can be kept to about 5 μm. The following charts entitled "Layer Positions from Zero Throat Height (ZTH) defined by I2" and "Layer Thicknesses defined by I2" show preferred and most preferred positions and thicknesses of the various layers of the present invention wherein insulation layer I2 defines the zero throat height.

| Layer Positions from Zero Throat Height (ZTH) defined by I2 | | |
|---|---|---|
| Layer | Preferred | Most Preferred |
| I₁ | 5 μm to 2 μm before coil | 5.0 μm |
| Coil | 13 μm–17 μm | 15.0 μm |
| I₂ | 0 | 0 |
| I₃ | ½ point between I2 and coil or 8 μm to 12 μm from ZTH | 10.0 μm |
| Flare Point | 2 μm – up | 2 μm – up |
| Write Gap (G3) | .25 μm ± 50% | .25 μm ± 10% |
| I₁ | 0.75 μm ± 20% | 0.75 μm ± 10% |
| Coil | 2.5 μm ± 20% | 2.5 μm ± 20% |
| I₂ | 0.75 μm ± 20% above coil and 2.5 μm ± 20% in front of coil | 0.75 μm ± 10% above coil and 2.5 μm ± 10% in front of coil |
| I₃ | 0.75 μm ± 20% above I2 | 0.5 μm ± 20% above I2 |
| I₂ + I₃ | 1.0 μm ± 20% top of coil | 1.0 μm ± 10% top of coil |
| Total Insulation Stack | 5.0 μm ± 20% | 5.0 μm ± 10% |
| Second Pole Piece (P2) | 3 μm | 3 μm |

Because of the layer thicknesses and especially the positioning of the insulation layers in the present invention the second pole tip can be constructed with a very narrow track width as will be explained hereinafter.

Alternatively, the apex 74 of the third insulation layer I3 can be employed in accordance with the present invention to define the zero throat height as shown in the magnetic head 110 of FIG. 9. The first insulation layer I1 can be positioned about 5 μm from the zero throat height and the second insulation layer I2 can be positioned about 12 μm from the zero throat height. The thicknesses of the layers in the coil area can be substantially the same as described for the head 100 shown in FIG. 8 and as set forth in the charts. The head 110 has a low profile similar to the low profile head 100.

Figure 10:
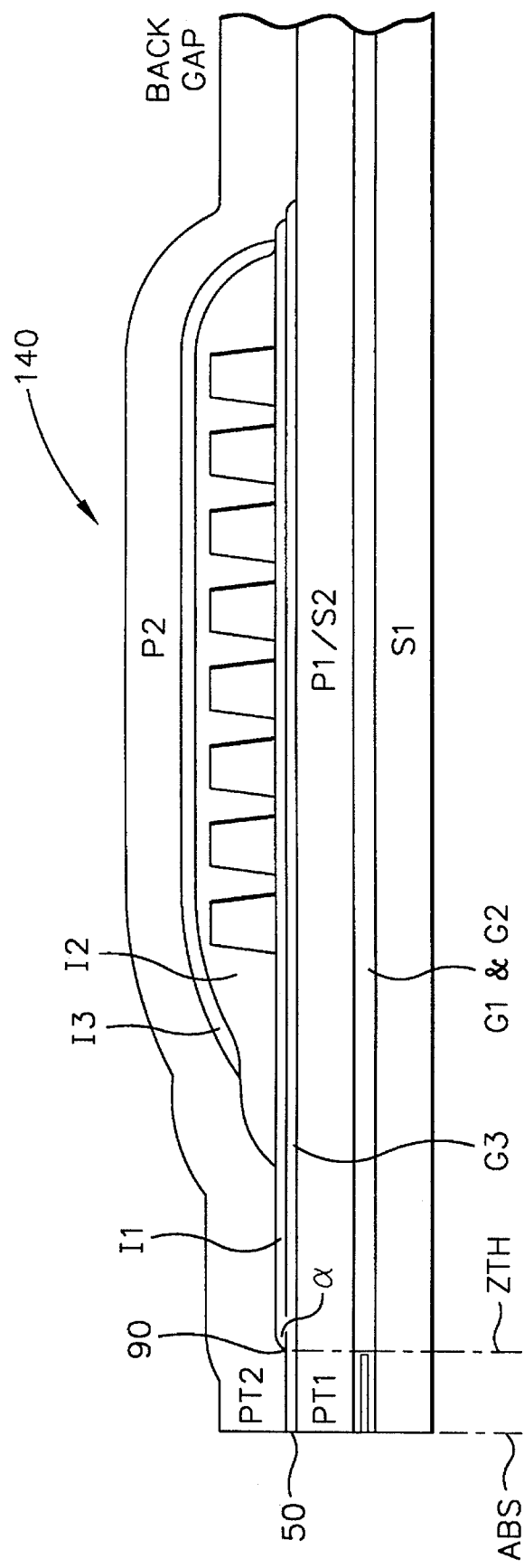
FIG. 10 is a cross-sectional side view of still another embodiment of the present invention wherein the first insulation layer defines the zero throat height.

Alternatively, the apex 90 of the first insulation layer I1 can be employed in accordance with the present invention to define the zero throat height as shown in the magnetic head 140 of FIG. 10. The second insulation layer I2 can be positioned from 5 μm from the ZTH to 3 μm before coil. The thicknesses of the layers in the coil area can be substantially the same as described for the head 100 in FIG. 8 and as set forth in the charts. The thickness of the zero throat height defining layer I1 can remain the same or can be increased slightly to 0.75 μm to produce a more definite edge as to aid in the metrology (size) during fabrication. The head 140 has the lowest possible profile which will help the apex angle move closer to the zero throat height.

The following three charts consolidate previously described preferred thicknesses and dimensions when one of the insulation layers I1, I2 or I3 defines the zero throat height.

| Zero Throat Defining Insulation I2 | | | |
|---|---|---|---|
| Layer(s) | Thicknesses | Distance from ZTH | Apex Angle |
| I1 | .75 μm ± 20% | 5 μm to 2 μm before coil | |
| Coil | 2.5 μm ± 20% | 13 μm to 17 μm | |
| I2 | .75 μm to 2.5 μm ± 10% in front of coil | 0 μm | 50°–25° |
| I3 | .5 μm ± 20% above I2 | 8 μm to 2 μm before coil | |
| Stack Height I1 + I2 + I3 | 5 μm ± 20% | | |
| P2 Flare Point | | 2 μm–5 μm | |

| Zero Throat Defining Insulation I3 | | | |
|---|---|---|---|
| Layer(s) | Thicknesses | Distance from ZTH | Apex Angle |
| I1 | .75 μm ± 20% | 5 μm to 2 μm before coil | |
| Coil | 2.5 μm ± 20% | 13 μm to 17 μm | |
| I2 | .75 μm ± 20% above coil | ½ point between I1 and coil | |
| I3 | .75 μm to 2.5 μm ± 10% in front of coil | 0 μm | 5°–25° |
| Stack Height I1 + I2 + I3 | 5 μm ± 20% | | |
| P2 Flare Point | | 2 μm–5 μm | |

| Zero Throat Defining Insulation I1 | | | |
|---|---|---|---|
| Layer(s) | Thicknesses | Distance from ZTH | Apex Angle |
| I1 | .75 μm ± 10% | 0 μm | 5°–25° |
| Coil | 2.5 μm ± 20% | 13 μm to 17 μm | |
| I2 | .75 μm ± 20% above coil | 5 μm to 3 μm before coil | |
| I3 | .5 μm ± 20% above I2 | ½ point between I2 and coil | |
| Stack Height I1 + I2 + I3 | 5 μm ± 20% | | |
| P2 Flare Point | | 2 μm–5 μm | |

EXAMPLE

A magnetic head was constructed employing I2 to define the zero throat height. This head demonstrated a recorded density of 3.25 gigabits per square inch which is the highest density yet achieved in magnetic recording.

The conditions for such demonstration and head parameters were:

Disk: $Mr_t$=0.58 Memu/cm², Hc=1920 oe, S=077
Read Head type: Magnetic Resistive 1.23 μm wide
Write Head:
  I1=0.81 μm avg. thickness±0.08 μm at 8 μm from ZTH
  I2=ZTH defining layer=2.56 μm thickness in front of coil and 0.77 μm thickness on top of coil—Apex angle=18°
  I3=0.76 μm thickness on top of I2 and 12 μm distance from ZTH
  Coil=10 turns Cu coil=2.62 μm thickness
  Write gap=0.25 μm thickness±80 Å
  P1=NiFe plated=3.16 μm avg. thickness
  P2=NiFe plated=3.22 avg. thickness A photoresist coating, used as a plating mask for the P2 layer, was 6.2 μm thick at the pole tip region and 4.35 μm thick on top of the stack.

The average size of the P2 pole tip width was 1.83 μm. with a distribution of ±9% across a 2"×2" square wafer area.

Figure 11:
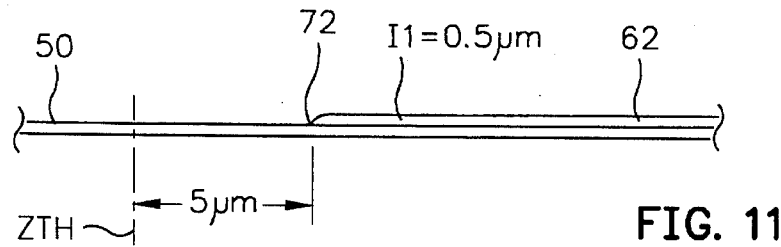
FIGS. 11–14 are schematic illustrations of various steps involved in making the present low profile write head shown in FIG. 8.
Figure 12:
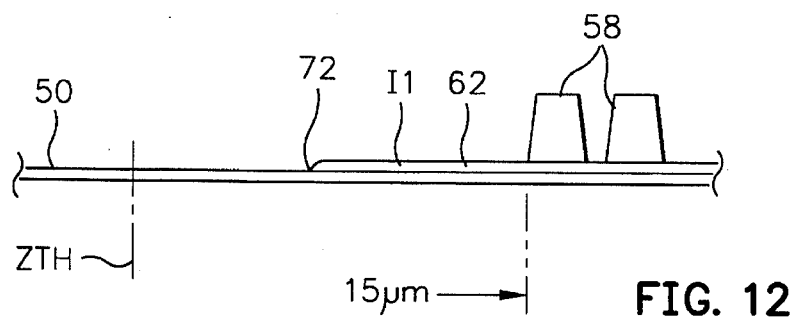
Figure 13:
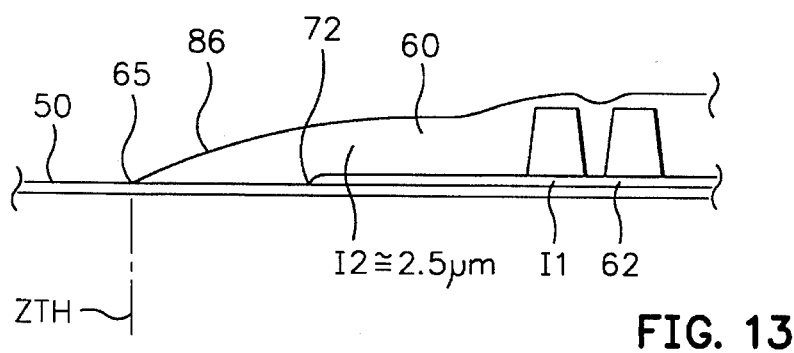
Figure 14:
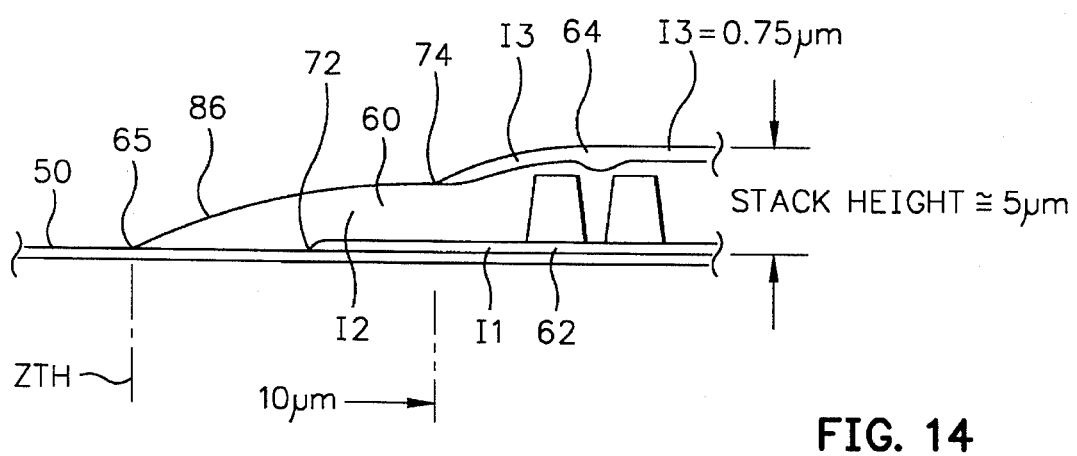

The method of the invention is illustrated in FIGS. 11–14. In FIG. 11 a first insulation layer 62 of approximately 0.5 μm thick is formed on top of the gap layer 50 approximately 5 μm behind the zero throat height. In FIG. 12 the coil layer 58 approximately 2.5 to 3 μm thick is formed on top of the first insulation layer 62 approximately 15 μm back from the zero throat height. In FIG. 13 the second insulation layer 60, which is approximately 0.75 μm thick on top of the coil layer 58, forms the zero throat height. It can be seen from this figure that the sloping region 86 of the second insulation layer 60 extends from its apex 65 a long distance as compared to the combined sloping regions 84, 86 and 88 of the insulation layers of the prior art write head shown in FIGS. 3 and 5. A third insulation layer 64 on the order of 0.75 μm thick is formed on top of the second insulation layer with its apex 74 approximately 10 μm behind the zero throat level. These three insulation layers form a low profile insulation stack height which is approximately 5 μm. In FIG. 15 the photoresist is spin coated on top of all of the layers which causes a thickness of the photoresist layer in the body of the head to be approximately 3.5 μm and the thickness of the photoresist layer in the pole tip region to be approximately 6.5 μm thick. This thickness of 6.5 μm of the photoresist in the pole tip region of the present invention is considerably less than the thickness of 11 μm of the photoresist in the pole tip region of the prior art. The flare point 76 can now be located approximately 2 μm behind the zero throat height so that the head has minimal pole tip flux saturation and is more efficient. Accordingly, when the photoresist layer is exposed to light for patterning very little light will be reflected from the sloping portion 86 of the second insulation layer into the pole tip region since the width of the exposed sloping portion 80 is the same as the width of the exposed pole tip region. After photo patterning in FIG. 15 the second pole piece and the second pole tip are simultaneously plated. After removal of the photoresist patterning layer the pole piece and pole tip are configured as shown in FIG. 8. The pole tip has well formed sidewalls and excellent line width control. Since the thickness of the photoresist layer in the pole tip region is only about 6.5 μm a 2 Gb write head can be constructed using the desirable aspect ratio of 4 mentioned hereinabove.

FIG. 16 illustrates the configuration of a photoresist layer to construct the low profile head shown in FIG. 9. In this head the apex 74 of the third insulation layer I3 defines the zero throat height. The thickness of the photoresist layer in the pole tip region is about 6.5 μm which is the same as shown in FIG. 15. Because of the low profile the second pole tip can be well formed for this head.

Figure 17:
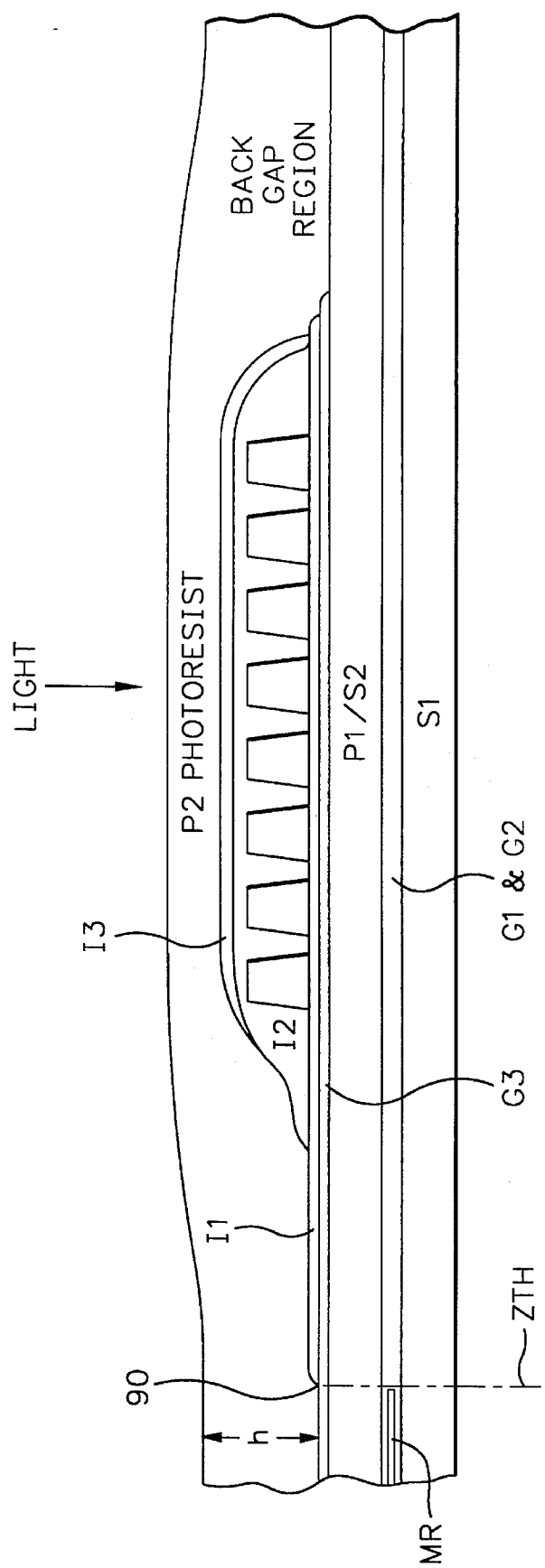
FIG. 17 is similar to FIG. 9 except a photoresist layer is shown for patterning the second pole piece and the second pole tip when I1 defines the zero throat height.

FIG. 17 illustrates the configuration of a photoresist layer to construct the low profile head shown in FIG. 10. In this head the apex 90 of the first insulation layer I1 defines the zero throat height. The thickness of the photoresist layer in the pole tip region is about 6.5 μm which is the same as shown in FIGS. 15 and 16.

Figure 18:
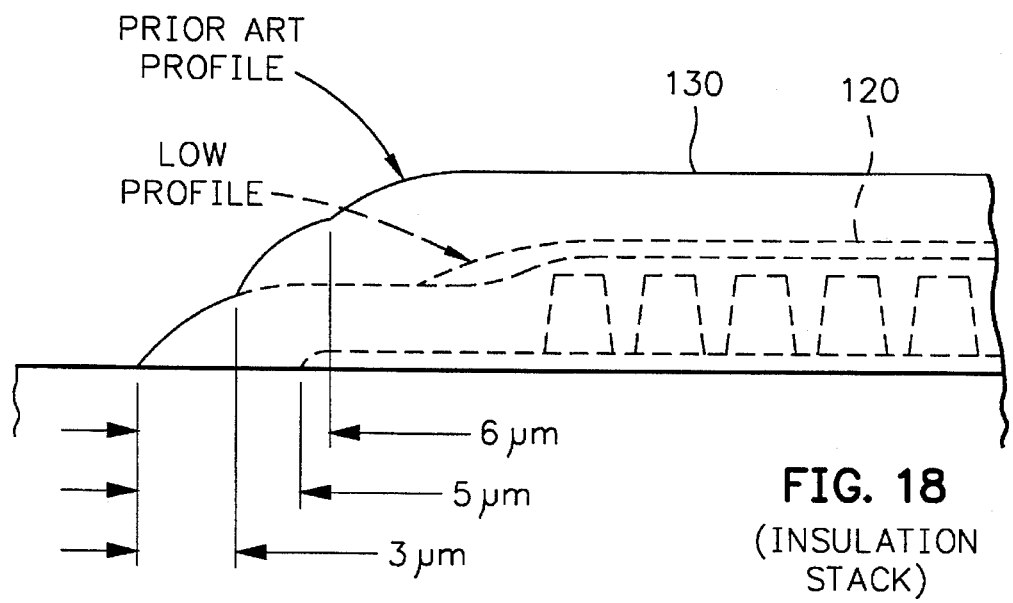
FIG. 18 is a schematic illustration of the difference in profile between a prior art write head and the present low profile write head.

As shown in FIG. 18 the insulation stack 120 of the present thin film write head has been significantly decreased from the insulation stack 130 of the prior art thin film write head. Accordingly, the present low profile write head is lighter in weight and more compact than the prior art write head. With the present invention a very high resolution high density second pole tip is constructed simultaneously with the second pole piece by ordinary photolithography processing. The present invention allows the flare point to be optimized close to the zero throat height so that there is less pole tip saturation, minimal flux leakage and improved performance of the head.

Clearly, other embodiments and modifications of this invention will occur readily to those of ordinary skill in the art in view of these teachings. For instance, in a broad concept of the present invention, the insulation stack could consist of only two insulation layers with one insulation layer defining the zero throat height and the other insulation layer having is apex at least 5 μm from the zero throat height toward the back gap. It should be understood that the composition of the insulation layers I1, I2 and I3 can be other than photoresist such as a dielectric ($S_iO_2$ or $Al_2O_3$) or a polyimide. Therefore, this invention is to be limited only by the following claims, which include all such embodiments and modifications when viewed in conjunction with the above specification and accompanying drawings.

We claim:

1. A thin film low profile write head which has a zero throat height between a back gap and a head surface for facing a magnetic medium, a flare point between the zero throat height and the back gap, a pole tip region located between the head surface and the flare point and a yoke region located between the flare point and the back gap, the write head comprising:

first and second pole pieces located in the pole tip region and the yoke region, the second pole piece having a second pole tip in the pole tip region;

a plurality of insulation layers overlying the first pole piece in the yoke region, each of the insulation layers having an apex where the insulation layer commences and each layer extending from the apex toward the back gap and said second pole piece being photopatterned by means of a photoresist layer which covers said insulation layers;

one of the insulation layers being a zero throat defining insulation layer which is located with its apex at and defining the zero throat height and having a profile between the zero throat height and the flare point;

another one of said insulation layers, which has a thickness, being the next closest insulation layer to the zero throat height with its apex at a predetermined distance from the zero throat height; and said predetermined distance being sufficient so that the location of the apex of the zero throat height defining insulation layer and said profile of the zero throat height defining insulation layer are not altered by said thickness of said next closest insulation layer, whereby light directed perpendicular to a major surface of said first pole piece into the photoresist layer will undergo substantially no reflection from the insulation layers into regions laterally adjacent said pole tip region so that the second pole tip is formed with smooth straight side walls by means of a photoresist pattern obtained by exposing the photoresist layer with said light and then developing said photoresist layer.

2. A magnetic media drive including the write head as claimed in claim 1, the drive comprising:

a housing;

a support mounted in the housing for supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, for controlling movement of the magnetic medium and for controlling the position of the head.

3. A write head as claimed in claim 1 wherein the flare point is 2 um to 5 um from the zero throat height.

4. A write head as claimed in claim 1 including:

at least one coil layer imbedded in said plurality of insulation layers; and said coil layer commencing at a distance from the zero throat height which is in the range of 13 um to 17 um.

5. A write head as claimed in claim 1 including:

said plurality of insulation layers comprising first, second and third insulation layers;

the first insulation layer being on top of the first pole piece;

a coil layer on top of the first insulation layer;

the second insulation layer being on top of the coil layer and the first insulation layer; and the third insulation layer being on top of the second insulation layer.

6. A write head as claimed in claim 5 wherein said zero throat defining insulation layer is said second insulation layer and said next closest insulation layer is said first insulation layer.

7. A write head as claimed in claim 6 wherein the flare point is 2 um to 5 um from the zero throat height.

8. A write head as claimed in claim 6 including:

the coil layer commencing at a distance from the zero throat height which is in the range of 13 um to 17 um;

the apex of the first insulation layer being located between the coil layer and the zero throat height at a distance from the coil layer which is in the range of 2 um to 5 um; and the apex of the third insulation layer being located between the coil layer and the zero throat height at a distance from the coil layer which is in the range of 2 um to 8 um.

9. A write head as claimed in claim 8 including:

the thickness of the first insulation layer being in the range of 0.75 um±20%;

the thickness of the coil layer being in the range of 2.5 um±20%;

the thickness of the second insulation layer being in the range of 0.75 um to 2.5 um±10% in a region between the coil layer and the zero throat height; and the thickness of the third insulation layer being in the range of 0.5 um above the second insulation layer±20%.

10. A write head as claimed in claim 9 wherein the flare point is 2 um to 5 um from the zero throat height.

11. A magnetic media drive including the write head as claimed in claim 10, the drive comprising:

a housing;

a support mounted in the housing for supporting the head;

medium moving means mounted in the housing for moving a magnetic medium past the head in a transducing relationship therewith:

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, for controlling movement of the magnetic medium and for controlling the position of the head.

12. A write head as claimed in claim 5 wherein said zero throat defining insulation layer is said third insulation layer and said next closest insulation layer is said first insulation layer.

13. A write head as claimed in claim 12 wherein the flare point is 2 um to 5 um from the zero throat height.

14. A write head as claimed in claim 12 including:

the coil layer commencing at a distance from the zero throat height which is in the range of 13 um to 17 um;

the apex of the first insulation layer being located between the coil layer and the zero throat height at a distance from the commencement of the coil layer which is in the range of 2 um to 5 um; and the apex of the second insulation layer being located midway between commencement of the coil layer and the apex of the first insulation layer.

15. A write head as claimed in claim 14 including:

the thickness of the first insulation layer being in the range of 0.75 um±20%;

the thickness of the coil layer being in the range of 2.5 um±20%;

the thickness of the second insulation layer being in the range of 0.75 um±20% in a region above the coil; and the thickness of the third insulation layer being in the range of 0.75 um to 2.5 um±10% in a region between the coil layer and the zero throat height.

16. A write head as claimed in claim 15 wherein the flare point is 2 um to 5 um from the zero throat height.

17. A magnetic media drive including the write head as claimed in claim 16, the drive comprising:

a housing;

a support mounted in the housing for supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, for controlling movement of the magnetic medium and for controlling the position of the head.

18. A write head as claimed in claim 5 wherein said zero throat defining insulation layer is said first insulation layer and said next closest insulation layer being is second insulation layer.

19. A write head as claimed in claim 18 wherein the flare point is 2 um to 5 um from the zero throat height.

20. A write head as claimed in claim 18 including:

the coil layer commencing at a distance from the zero throat height which is in the range of 13 um to 17 um;

the apex of the second insulation layer being located between the coil layer and the zero throat height at a distance from the commencement of the coil layer which is in the range of 3 um to 5 um; and the apex of the third insulation layer being located midway between commencement of the coil layer and the apex of the second insulation layer.

21. A write head as claimed in claim 20 including:

the thickness of the first insulation layer being in the range of 0.75 um±10%;

the thickness of the coil layer being in the range of 2.5 um±20%;

the thickness of the second insulation layer being in the range of 0.75 um±20% in a region above the coil layer; and the thickness of the third insulation layer being in the range of 0.75 um±20% in a region above the second insulation layer.

22. A write head as claimed in claim 21 wherein the flare point is 2 um to 5 um from the zero throat height.

23. A magnetic media drive including the write head as claimed in claim 22, the drive comprising:

a housing;

a support mounted in the housing tier supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, for controlling movement of the magnetic medium and for controlling the position of the head.

24. A thin film low profile write head which has a zero throat height between a back gap and a head surface for facing a magnetic medium, a flare point between the zero throat height and the back gap, a pole tip region located between the head surface and the flare point and a yoke region located between the flare point and the back gap, the write head comprising:

first and second pole pieces located in the pole tip region and the yoke region, the second pole piece having a second pole tip in the pole tip region;

at least one coil layer commencing at least 13 μm from the zero throat height and extending toward the back gap to define a coil region;

first to nth insulation layers overlying the first pole piece in the yoke region, and being the first to nth closest insulation layers respectively to the first pole piece in the coil region, each of the insulation layers having an apex where the insulation layer commences, and each layer extending from the apex toward the back gap and said second pole piece being photopatterned by means of a photoresist layer which covers said insulation layers;

the first insulation layer having an apex which is located a predetermined distance from the zero throat height and having a thickness;

the apex of another one of the insulation layers being located at and defining the zero throat height and having a profile between the zero throat height and said flare point; and said predetermined distance being sufficient so that the location of the apex of the zero throat height defining insulation layer and said profile of the zero throat height defining insulation layer are not altered by said thickness of said next closest insulation layer;

whereby light directed perpendicular to a major surface of said first pole piece into the photoresist layer will undergo substantially no reflection from the insulation layers into regions laterally adjacent said pole tip region so that the second pole tip is formed with smooth straight side walls by means of a photoresist pattern obtained by exposing the photoresist layer with said light and then developing said photoresist layer.

25. A magnetic media drive including the write head as claimed in claim 24, the drive comprising:

a housing;

a support mounted in the housing for supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, controlling movement of the magnetic medium and controlling the position of the head.

26. A write head as claimed in claim 24 including:

said insulation layers including second and third insulation layers which correspond to n=2 and n=3, respectively;

the apex of said another one of the insulation layers being the apex of the second insulation layer.

27. A write head as claimed in claim 26 wherein the first insulation layer has a thickness of 0.75±20% μm.

28. A write head as claimed in claim 26 including:

the first, second and third insulation layers forming an insulation stack;

a total thickness of the insulation stack being 5±20% μm.

29. A write head as claimed in claim 28 wherein the second pole has a flare point which is 2 μm to 5 μm from the zero throat height.

30. A write head as claimed in claim 28 including:

the flare point being substantially 3 μm from the zero throat height; and the commencement of the coil layer being substantially 15 μm from the zero throat height.

31. A write head as claimed in claim 30 wherein the first insulation layer has a thickness of 0.75±20% μm.

32. A write head as claimed in claim 31 including:

the first, second and third insulation layers forming an insulation stack;

a total thickness of the insulation stack being 5±20% μm.

33. A magnetic media drive including the write head as claimed in claim 32, the drive comprising:

a housing;

a support mounted in the housing for supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, controlling movement of the magnetic medium and controlling the position of the head.

34. A write head as claimed in claim 26 including:

the first insulation layer lying substantially in a common plane with a portion of the second insulation layer.

35. A write head as claimed in claim 34 including:

the flare point being located in a region between the zero throat height and the apex of the first insulation layer.

36. A write head as claimed in claim 34 including:

the apex of the third insulation layer being located in a region between the apex of the first insulation layer and the back gap.

37. A magnetic media drive including the write head as claimed in claim 36, the drive comprising:

a housing;

a support mounted in the housing for supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, controlling movement of the magnetic medium and controlling the position of the head.

38. A write head as claimed in claim 36 wherein the second pole has a flare point which is 2 μm to 5 μm from the zero throat height.

39. A write head as claimed in claim 38 including:

the flare point being substantially 3 μm from the zero throat height; and the commencement of the coil layer being substantially 15 μm from the zero throat height.

40. A write head as claimed in claim 39 wherein the first insulation layer has a thickness of 0.75±20% μm.

41. A write head as claimed in claim 40 including:

the first, second and third insulation layers forming an insulation stack;

a total thickness of the insulation stack being 5±20% μm.

42. A magnetic media drive including the write head as claimed in claim 41, the drive comprising:

a housing;

a support mounted in the housing for supporting the head;

medium moving means mounted in the housing for moving a magnetic medium past the head in a transducing relationship therewith;

positioning means connected to the support for moving the head to multiple positions with respect to a moving magnetic medium so as to process signals with respect to multiple tracks on the magnetic medium; and control means connected to the head, the magnetic medium moving means and the positioning means for controlling and processing signals with respect to the head, controlling movement of the magnetic medium and controlling the position of the head.

43. A method of making a thin film low profile write head which has and a back gap and a head surface for facing a magnetic medium, a flare point located between the head surface and the back gap and a zero throat height located between the head surface and the flare point, a pole tip region located between the head surface and the flare point and a yoke region located between the flare point and the back gap, the method comprising the steps of:

forming first and second pole pieces in the pole tip region and the yoke region, the second pole piece having a second pole tip in the pole tip region:

forming a plurality of insulation layers over the first pole piece in the yoke region, each of the insulation layers having an apex where the insulation layer commences and each layer extending from the apex toward the back gap;

forming one of the insulation layers as a zero throat height defining insulation layer which is located with its apex at and defining the zero throat height with a profile between the zero throat height and the flare point;

forming another one of said insulation layers, with a thickness, as the next closest insulation layer to the zero throat height with its apex at a predetermined distance from the zero throat height; and said predetermined distance being sufficient so that the location of the apex of the zero throat height defining layer and said profile of the zero throat height defining insulation layer are not altered by said thickness of said next closest insulation layer, whereby light directed perpendicular to a major surface of said first pole piece into a photoresist layer will undergo substantially no reflection from the insulation layers into regions laterally adjacent said pole tip region so that the second pole tip is formed with smooth straight side walls by means of a photoresist pattern obtained by exposing the photoresist layer with said light and then developing said photoresist layer.

44. A method as claimed in claim 43 including the steps of:

forming the second pole piece in the pole tip region and the yoke region after forming said plurality of insulation layers;

forming the second pole piece with said photoresist layer which comprises a photoresist layer portion it the pole tip region and a photoresist layer portion in the yoke region;

exposing said photoresist layer to light for patterning the second pole piece; and said predetermined distance being sufficient so that oblique light scattering from the insulation layers laterally onto the pole tip region is minimized when said photoresist layer is exposed to said light.

45. A method as claimed in claim 44 wherein the step of forming the second pole piece further includes forming the flare point 2 um to 5 um from the zero throat height.

46. A method as claimed in claim 44 including the steps of:

imbedding at least one coil layer in said plurality of insulation layers; and forming said coil layer so that it commences at a distance from the zero throat height which is in the range of 13 um to 17 um.

47. A method as claimed in claim 44 including:

forming first, second and third insulation layers for said plurality of insulation layers;

forming the first insulation layer on top of the first pole piece;

forming a coil layer on top of the first insulation layer;

forming the second insulation layer on top of the coil layer and the first insulation layer; and forming the third insulation layer on top of the second insulation layer.

48. A method as claimed in claim 47 including the steps of:

forming said second insulation layer as said zero throat height defining insulation layer; and forming said first insulation layer as said next closest insulation layer.

49. A method as claimed in claim 48 wherein the step of forming said second pole piece includes forming the flare point 2 um to 5 um from the zero throat height.

50. A method as claimed in claim 48 including:

forming the coil layer so that it commences at a distance from the zero throat height which is in the range of 13 um to 17 um;

forming the apex of the first insulation layer between the commencement of the coil layer and the zero throat height at a distance from the coil layer which is in the range of 2 um to 5 um from the zero throat height; and forming the apex of the third insulation layer between the coil layer and the zero throat height at a distance from the commencement of the coil layer which is in the range of 2 um to 8 um from the zero throat height.

51. A method as claimed in claim 50 including the steps of:

forming the first insulation layer with a thickness in the range of 0.75 um±20%;

forming the coil layer with a thickness in the range of 2.5 um±20%;

forming the second insulation layer with a thickness in the range of 0.75 um to 2.5 um±10% in a region between the coil layer and the zero throat height; and forming the third insulation layer with a thickness in the range of 0.5 um above the second insulation layer±20%.

52. A method as claimed in claim 51 wherein the step of forming the second pole piece includes forming the flare point 2 um to 5 um from the zero throat height.

53. A method as claimed in claim 47 including the steps of:

forming said third insulation layer as said zero throat height defining insulation layer; and forming said first insulation layer as said next closest insulation layer.

54. A method as claimed in claim 53 wherein the step of forming the second pole piece forms the flare point 2 um to 5 um from the zero throat height.

55. A method as claimed in claim 53 including:

forming the coil layer so that it commences at a distance from the zero throat height which is in the range of 13 um to 17 um;

forming the apex of the first insulation layer between the coil layer and the zero throat height at a distance from the commencement of the coil layer which is in the range of 2 um to 5 um from the zero throat height; and forming the apex of the second insulation layer substantially midway between the commencement of the coil layer and the apex of the first insulation layer.

56. A method as claimed in claim 55 including:

forming the first insulation layer with a thickness in the range of 0.75 um±20%;

forming the coil layer with a thickness in the range of 2.5 um±20%;

forming the second insulation layer with a thickness in the range of 0.75 um ±20% in a region above the coil; and forming the third insulation layer with a thickness in the range of 0.75 um to 2.5 um±10% in a region between the coil layer and the zero throat height.

57. A method as claimed in claim 56 wherein the step of forming the second pole piece includes forming the flare point 2 um to 5 um from the zero throat height.

58. A method as claimed in claim 47 including the steps of:

forming said first insulation layer as said zero throat defining insulation layer; and forming said second insulation layer as said next closest insulation layer.

59. A method as claimed in claim 58 wherein the step of forming the second pole piece includes forming the flare point 2 um to 4 um from the zero throat height.

60. A method as claimed in claim 58 including the steps of:

forming the coil layer so that it commences at a distance from the zero throat height which is in the range of 13 um to 17 um;

forming the apex of the second insulation layer between the coil layer and the zero throat height at a distance from the commencement of the coil layer which is in the range of 3 um to 5 um from the zero throat height; and forming the apex of the third insulation layer substantially midway between the commencement of the coil layer and the apex of the second insulation layer.

61. A method as claimed in claim 60 including the steps of:

forming the first insulation layer with a thickness in the range of 0.75 um±10%;

forming the coil layer with a thickness in the range of 2.5 um±20%;

forming the second insulation layer with a thickness in the range of 0.75 um ±20% in a region above the coil layer; and forming the third insulation layer with thickness in the range of 0.5 um±20% in a region above the second insulation layer.

62. A method as claimed in claim 61 wherein the step of forming the second pole piece includes forming the flare point 2 um to 5 um from the zero throat height.

\* \* \* \* \*